United States Patent [19]
Müller et al.

[11] Patent Number: 5,244,257
[45] Date of Patent: Sep. 14, 1993

[54] TWO-CHANNEL ANTI-LOCK BRAKE SYSTEM FOR A TWO-WHEEL MOTOR VEHICLE

[75] Inventors: Elmar Müller, Markgröningen, Fed. Rep. of Germany; Werner Müller, Higashi Gaoka, Japan

[73] Assignee: Robert Bosch GmbH, Stuttgart, Fed. Rep. of Germany

[21] Appl. No.: 844,572

[22] PCT Filed: Sep. 13, 1990

[86] PCT No.: PCT/EP90/01557
§ 371 Date: Mar. 27, 1992
§ 102(e) Date: Mar. 27, 1992

[87] PCT Pub. No.: WO91/04898
PCT Pub. Date: Apr. 18, 1991

[30] Foreign Application Priority Data
Sep. 29, 1989 [DE] Fed. Rep. of Germany ....... 3932637

[51] Int. Cl.$^5$ .......................... B60T 8/88; B60T 8/32; B60T 17/22; B62L 3/00
[52] U.S. Cl. .................. 303/92; 188/181 A; 303/97; 303/103
[58] Field of Search ............... 303/92, 100, 102, 103, 303/105, 106, 97, 99; 364/426.01, 426.02; 73/121; 340/453; 188/181 A, 181 C

[56] References Cited

U.S. PATENT DOCUMENTS

| | | | |
|---|---|---|---|
| 3,874,743 | 4/1975 | Fleischer et al. | |
| 3,883,184 | 5/1975 | Jonner et al. | 303/92 |
| 4,035,032 | 7/1977 | Bertolasi | |
| 4,425,622 | 1/1984 | Arikawa | 303/91 X |
| 4,717,211 | 1/1988 | Dittner | 303/61 X |
| 4,728,156 | 3/1988 | Burgdorf et al. | 303/92 |
| 4,884,056 | 11/1989 | Ishizaki | 303/92 X |
| 4,955,671 | 9/1990 | Higashimura | 303/92 |

FOREIGN PATENT DOCUMENTS

| | | |
|---|---|---|
| 2232034 | 1/1974 | Fed. Rep. of Germany . |
| 2549587 | 5/1977 | Fed. Rep. of Germany . |
| 2702800 | 7/1978 | Fed. Rep. of Germany . |
| 3102227 | 1/1982 | Fed. Rep. of Germany . |
| 3119064 | 2/1982 | Fed. Rep. of Germany . |
| 2586388 | 2/1987 | France . |
| 2068068 | 8/1981 | United Kingdom . |

*Primary Examiner*—Douglas C. Butler
*Attorney, Agent, or Firm*—Michael J. Striker

[57] ABSTRACT

A motorcycle anti-lock brake system reacts to the appearance of a fault in one of the two control channels before or during a braking procedure on both wheels. The motorcycle anti-lock brake system is formed so that a limited anti-lock brake system function is initially maintained and the anti-lock brake system is not completely switched off until later.

21 Claims, 2 Drawing Sheets

| BRAKE ACTUATION 1 | TIME WHEN FAULT APPEARS 2 | RSS FAULT FRONT WHEEL 3 | RSS FAULT REAR WHEEL 4 | SOLENOID VALVE 5 | PUMP MOTOR 6 | LOW VOLTAGE 7 | ECU 8 | VALVE RELAY 9 | BLS CONDUCTOR BROKEN 10 | RESERVOIR SWITCH 11 |
|---|---|---|---|---|---|---|---|---|---|---|
| NONE | AT REST | 1.1.1 | 1.1.2 | 1.1.3 | 1.1.4 | 1.1.5 | 1.1.6 | 1.1.7 | 1.1.8 | 1.1.9 |
| NONE | CONTINUOUS TRAVEL | 1.2.1 | 1.2.2 | 1.2.3 | 1.2.4 | 1.2.5 | 1.2.6 | 1.2.7 | 1.2.8 | 1.2.9 |
| FRONT WHEEL | BEFORE CONTROL | 2.1.1 | 2.1.2 | 2.1.3 | 2.1.4 | 2.1.5 | 2.1.6 | 2.1.7 | 2.1.8 | 2.1.9 |
| REAR WHEEL | BEFORE CONTROL | 2.2.1 | 2.2.2 | 2.2.3 | 2.2.4 | 2.2.5 | 2.2.6 | 2.2.7 | 2.2.8 | 2.2.9 |
| FRONT + REAR | BEFORE CONTROL | 2.3.1 | 2.3.2 | 2.3.3 | 2.3.4 | 2.3.5 | 2.3.6 | 2.3.7 | 2.3.8 | 2.3.9 |
| FRONT WHEEL | DURING CONTROL | 3.1.1 | 3.1.2 | 3.1.3 | 3.1.4 | 3.1.5 | 3.1.6 | 3.1.7 | 3.1.8 | 3.1.9 |
| REAR WHEEL | DURING CONTROL | 3.2.1 | 3.2.2 | 3.2.3 | 3.2.4 | 3.2.5 | 3.2.6 | 3.2.7 | 3.2.8 | 3.2.9 |
| FRONT + REAR | DURING CONTROL | 3.3.1 | 3.3.2 | 3.3.3 | 3.3.4 | 3.3.5 | 3.3.6 | 3.3.7 | 3.3.8 | 3.3.9 |

RSS = ROTATIONAL SPEED SENSOR
ECU = ELECTRONIC CONTROL UNIT
BLS = BRAKE LIGHT SWITCH

FIG. 1

TWO-CHANNEL ANTI-LOCK BRAKE SYSTEM FOR A TWO-WHEEL MOTOR VEHICLE

BACKGROUND OF THE INVENTION

The present invention relates to a brake system for a two-wheel motor vehicle. More particularly it relates to a two-channel anti-lock brake system for a two-wheel motor vehicle.

Two-channel anti-lock brake systems for two-wheel motor vehicles of the above mentioned general type are known in the art.

A motorcycle anti-lock brake system is known from the brochure of the company FAG Kugelfischer Georg Schäfer KG aA with the title Antiblockierregelsystem für Motorräder (Anti-lock brake system for motorcycles), Publication No. HB 43 605/2 DA.

In the known motorcycle anti-lock brake system, the recognition of faults causes the anti-lock brake system to be switched off immediately. During the course of a closed-loop control operation, this generally leads to the immediate locking of the wheels of the vehicle. In the case of a four-wheel vehicle, this does not signify a driving situation which is critical in terms of safety. In contrast to a passenger car, however, a two-wheel vehicle will in all probability fall over if the system is unexpectedly switched off.

SUMMARY OF THE INVENTION

Accordingly, it is an object of the present invention to provide a two-channel anti-lock brake system for a two-wheel motor vehicle, which avoids the disadvantages of the prior art.

In keeping with these objects and with others which will become apparent hereinafter, one feature of the present invention resides, briefly state, in a two-channel, anti-lock brake system for both wheels of a two-wheel motor vehicle in which when both wheels are being braked simultaneously and a fault occurs in one channel, a limited anti-lock brake system function is retained in form a normal closed-loop control using the intact channel and pressure introduction at the brake of a defective channel until a certain vehicle deceleration is reached, and the anti-lock brake system is only switched off when the vehicle comes to rest or when the anti-lock brake system closed-loop control operation ends.

The present invention prevents the system from being switched off automatically and simultaneously ensures the legally specified minimum vehicle deceleration (0.3 g) at high coefficients of friction.

From German Offenlegungsschrift 2232 034, it is known to monitor the valves of an anti-lock brake system with respect to their response time. If the response time is found to be too long, a signal for switching off the anti-lock brake system is generated but this signal is blocked for a certain period when a certain wheel behaviour is present and only subsequently causes the system to be switched off.

In the invention, the attention of the driver is additionally drawn to the critical driving condition by flashing activation of the safety light.

With respect to the expression "two-channel anti-lock brake system", it should be made clear that it refers to an anti-lock brake system with two sensors and two pressure modulators. The question of whether more than two analysis channels are provided for reasons of redundancy is unimportant in this respect.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a table of possible faults classified for different situations.

DESCRIPTION OF PREFERRED EMBODIMENTS

Figure 2:
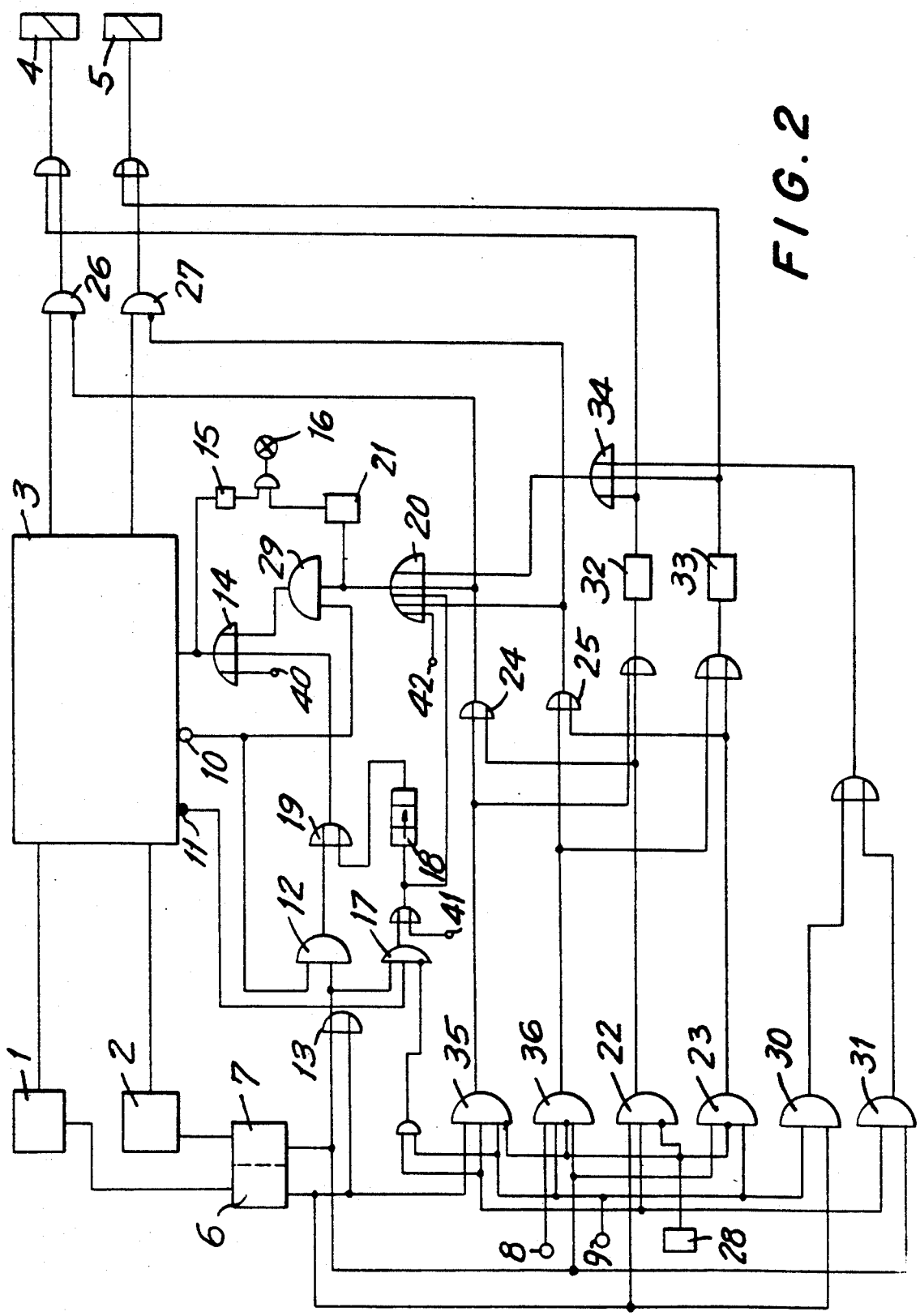
FIG. 2 is a view illustrating a system for achieving respective reactions to a sensor failure.

The table of FIG. 1 shows possible faults classified for different situations.

Column 1 states whether the brakes are applied and where in each case. Different times when the failure of individual components (Columns 3 to 11) appears are listed in Column 2, the individual expressions having the following significance At rest: Fault occurs when the vehicle is stopped Continuous travel: Fault occurs when moving Before control: Fault occurs when moving with partial braking or initially without braking and brake actuation in the warning period.

During control: Fault occurs during an anti-lock brake system control operation.

As an example, 2.3.1 signifies:

During unbraked (or partially braked) travel, the rotational speed sensor on the front wheel fails so that the control system is initiated (via slip signal and/or deceleration signal). Braking of both wheels then takes place into the warning period.

Five fault classes involving different reactions are derived from the table of FIG. 1 with respect to the processing of rotational speed sensor faults.

The first fault class includes the faults 1.1.1 and 1.1.2

The reaction is as follows:

a) The anti-lock brake system is switched off immediately b) The warning light is activated with a continuous signal. The normal brake system is available.

The second fault class includes the faults 1.2.1 and 1.2.2

The reaction is as follows:

a) The anti-lock brake system is switched off after a warning period of, for example, 10 seconds.

b) The warning light is pulsed during the warning period and is activated with a continuous signal after the system is switched off. The normal brake system is available after the anti-lock brake system is switched off.

The third fault class includes the faults 2.1.1, 2.2.2, 3.1.1 and 3.2.2

The reaction is as follows:

a) After recognition of a fault, a limited anti-lock brake system function is effective and this continues until the end of the closed-loop control operation or until the vehicle comes to rest; the system is then switched off. In the case of the limited anti-lock brake system function, pressure is built up as pulses at the defective wheel by means of the 3/3-way solenoid valve and, to be precise, until a calculated or analogously indicated deceleration of 0.3 g is attained; pressure is then held.

b) Pulsed activation of the warning light takes place during the limited function; continuous activation then takes place (after the system is switched off). The normal brake system is available after the anti-lock brake system is switched off.

The fourth fault class includes the faults 2.1.2, 2.2.1, 3.1.2, 3.2.1

The reaction is as follows:

a) Here again, a limited anti-lock brake system function is effective after recognition of a fault and until the end of the closed-loop control operation or until the vehicle comes to rest: the system is then switched off. The limited anti-lock brake system function consists in normal closed-loop control of the brake pressure of the intact wheel, with limited reference formation (only the wheel with closed-loop control contributes).

Pulsed activation of the warning light takes place during the limited function; continuous activation takes place after the system is switched off. The normal brake system is available after the anti-lock brake system is switched off.

The fifth fault class includes the faults 2.3.1, 2.3.2, 3.3.1, 3.3.2

The reaction is as follows:

a) After recognition of a fault, a limited anti-lock brake system function is maintained and this continues until the end of the closed-loop control operation or until the vehicle comes to rest: the system is then switched off. In the limited anti-lock brake system function, normal closed-loop control of the intact wheel is maintained with limited reference formation. In addition, pulsed build-up of pressure takes place at the wheel with the defective sensor by means of the 3/3-way solenoid valve and this continues until a calculated or analogously indicated vehicle deceleration of 0.3 g is reached; the pressure at the defective wheel is then held.

b) Pulsed activation of the warning light takes place during the limited function. Continuous activation takes place after the system is switched off. The normal brake system is available after the anti-lock brake system is switched off.

The following applies to the other faults listed in the table:

a) The anti-lock brake system is immediately switched off in the cases 1.1.3 (a valve fails), 1.1.4 (pump motor defective), 1.1.5 (low voltage is found), 1.1.6 to 3.3.6 (faults in the electronic system), 1.1.7 to 3.3.7 (defect on the valve relay), 1.1.8 (brake light switch conductor broken) and 1.1.9 (appearance of a switch fault at the hydraulic reservoir).

b) The anti-lock brake system is switched off after a warning period of, for example, 10 seconds in the cases 1.2.3, 2.1.3, 2.2.3 and 2.3.3 (a solenoid valve failure in various circumstances), 1.2.4, 2.1.4, 2.2.1 and 2.3.4 (pump motor failure in various circumstances), 1.2.5, 2.1.5, 2.2.5 and 2.3.5 (the appearance of a low voltage in various circumstances), 1.2.8, 2.1.8, 2.2.8 and 2.3.8 (brake light switch conductor broken in various circumstances) and 1.2.9, 2.1.9, 2.2.9 and 2.3.9 (appearance of a reservoir switch fault in various circumstances).

c) Finally, the anti-lock brake system is only switched off when the closed-loop control operation has ended or the motorcycle has come to rest in the cases 3.1.3, 3.2.3 and 3.3.3. (a solenoid valve failure during the closed-loop control operation), 3.1.4, 3.2.4 and 3.3.4 (pump motor fault during the closed-loop control operation), 3.1.5, 3.2.5 and 3.3.5 (appearance of a low voltage during the closed-loop control operation), 3.1.8, 3.2.8 and 3.3.8 (brake light switch conductor broken during the closed-loop control operation) and 3.1.9, 3.2.9 and 3.3.9 (reservoir switch fault during the closed-loop control operation).

In the cases b) and c), pulsed activation of the warning light takes place from recognition of the fault until the system is completely switched off: continuous activation then occurs.

An illustrative example of a system for achieving the above reactions to a sensor failure is shown in the drawing of FIG. 2. This indicates the sensors associated with the two vehicle wheels by 1 and 2, an analysis circuit by 3 and solenoid valves associated with the respective wheel brakes by 4 and 5. The brake pressure at the wheel brakes is varied to suit the wheel motion behaviour determined by the sensors 1 and 2.

The sensors 1 and 2 are monitored by the monitoring blocks 6 and 7. The monitoring blocks 6 or 7 emit a signal when the associated sensor is defective. There is a signal present at a terminal 8 when the front wheel brake is actuated. There is a signal present at a terminal 9 when the rear wheel brake is actuated. The analysis circuit 3 emits a signal via a terminal 10 when the vehicle is at rest and emits a signal via a terminal 11 when the vehicle is moving.

First fault class

If one of the sensors 1 or 2 becomes defective when the vehicle is at rest, an AND gate 12 becomes conductive (via the terminal 10 and an OR gate 13) and transmits a switch-off signal to the analysis circuit 3 (via an OR gate 14). This signal simultaneously tips a bistable element 15 which then activates a warning light 16 (continuously).

Second fault class

If the vehicle is moving (signal at terminal 11) and a sensor fails, then—provided there is no brake actuation—an OR gate 17 becomes conductive and triggers a time element 18 which, after a specified time, switches off the anti-lock brake system via an OR gate 19 and an OR gate 14. During the waiting period of the time element 18, a pulse generator 21 is brought into action by the output signal of the AND gate 17 via an OR gate 20 and the pulse generator 21 activates the warning light 16 in pulses until the warning light is subsequently activated continuously by the switch-off signal and the bistable element 15.

Third fault class

AND gates 22 and 23 are used to check whether the sensor 1 or 2 has failed on a wheel subject to braking. If this is the case, the activation of one of the valves 4 or 5 is interrupted by means of an OR gate 24 or 25 and an AND gate 26 or 27 so that pressure is built up at the associated brakes. The blocking signal ends when a vehicle deceleration signal generator 28 emits a signal when a vehicle deceleration of, for example, 0.3 g is reached or when the calculated vehicle deceleration has reached a threshold value of, for example, 0.3 g, the signal blocking an AND gate 22 or 23. The rear flank of the output signal of one of the AND gates 22 or 23 triggers one of the bistable elements 32 or 33 which now brings the solenoid valve 4 or 5 of the wheel whose sensor has failed into the constant hold position and therefore holds the pressure at the value to which it has been controlled. In the period of limited anti-lock brake system function, pulsed activation of the warning light 16 is undertaken via the OR gate 20. If the vehicle comes to rest, the system is switched off via an OR gate 34, the OR gate 20 and an AND gate 29 and the warning light 16 is continuously activated.

Fourth fault class

In this case, AND gates 30 and 31 are used to check whether the sensor of the vehicle wheel not subject to braking has failed. The output signal of one of the AND gates 30 or 31 then generated leaves unaffected the wheel subject to braking, whose sensor is of course intact, but initially starts the pulsed warning light activation via the OR gates 34 and 20. This pulsed warning light activation then becoming continuous activation when the vehicle comes to rest and the anti-lock brake system is switched off. Not shown is a connection, between each of the AND gates 30 and 31 and the analysis circuit 3, which causes a switch-over in the analysis circuit to reference formation with the sensor still intact.

Fifth fault class

Finally, the two AND gates 35 and 36 check whether one of the sensors fails during the actuation of both brakes. If this is the case, the activation of the associated solenoid valve 4 or 5 via OR gates 24 and 25 is prevented and the pressure is therefore built up. If the output signal of the AND gate 35 or 36 ends because the vehicle deceleration signal generator 28 emits a signal on reaching a certain vehicle deceleration, one of the bistable elements 32 or 33 is set by the rear flank of this signal and, therefore, pressure is held constant at the corresponding wheel. The other wheel remains unaffected. The warning light activation corresponds to the third fault class.

In the case of the fault in accordance with a) above, a corresponding signal is passed to the terminal 40 of the OR gate 14 and the anti-lock brake system is therefore immediately switched off.

In the case of the fault in accordance with b) above, a signal is connected to a terminal 41 which then causes the system to be switched off after a period and causes the warning light to pulse during this period Finally, in the case of a fault in accordance with c) above, a signal is provided at a terminal 42 by means of which the anti-lock brake system is switched off when the vehicle comes to rest and, until then, the warning light 16 is pulsed. A signal can appear at the terminal 10 when either the vehicle is at rest or the closed-loop control operation has ended.

The illustrative example of FIG. 2 is designed as a hardware circuit. Its functions can also, of course, be achieved by means of a computer and correspondingly configured software.

It will be understood that each of the elements described above, or two or more together, may also find a useful application in other types of constructions differing from the types described above.

While the invention has been illustrated and described as embodied in a two-channel anti-lock brake system for a two-wheel motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A braking device for a two-wheel motor vehicle, comprising separately actuatable brakes for both wheels of a two-wheel motor vehicle; and a two-channel anti-lock brake system for both wheels, switchable off when faults appear, said system being formed so that when both wheels are being braked simultaneously and a fault occurs in one channel, a limited anti-lock brake system function is retained in form of a normal closed-loop control using an intact channel and a pressure introduction at a brake of a defective channel until a certain vehicle deceleration is reached, and the system is only switched off when the vehicle comes to rest or when the system closed-loop control operation ends.

2. A braking device as defined in claim 1, wherein said system is formed so that when one vehicle wheel is being braked and a fault appears in the other channel, the closed-loop control at the brake of the intact control channel is retained until the vehicle comes to rest or until the closed-loop control operation ends, and the system is then switched off.

3. A braking device as defined in claim 1, wherein said system is formed so that when one vehicle wheel is being braked and a fault appears in an associated channel, a brake pressure is introduced at said channel until a specified vehicle deceleration is achieved, and the system is only switched off when the vehicle comes to rest or the closed-loop control operation ends.

4. A braking device as defined in claim 1, wherein said system is formed so that when the vehicle is moving without the brakes being operated and a fault appears in one channel, the system is switched off after a warning period.

5. A braking device as defined in claim 1; and further comprising means for generating a pulsed warning signal from a recognition of a fault to a final switching off of the system, and then after that generating a continuous warning signal.

6. A braking device as defined in claim 1; and further comprising a rotational speed sensor whose failure constitutes the fault.

7. A braking device as defined in claim 1, wherein said system is formed so that in the case of the failure of a brake pressure control valve in the absence of closed-loop control operation the system is switched off after a warning period.

8. A braking device as defined in claim 1, wherein said system is formed so that in the case of the failure of a hydraulic pump in the absence of closed-loop control operation the system is switched off after a warning period.

9. A braking device as defined in claim 1, wherein said system is formed so that in the case of a brake in a conductor of a brake light switch in the absence of closed-loop control operation the system is switched off after a warning period.

10. A braking device as defined in claim 1, wherein said system is formed so that in the case of an appearance of the switch fault at a hydraulic reservoir in the absence of closed-loop control operation the system is switched off after a warning period.

11. A braking device as defined in claim 1, wherein said system is formed so that in the case of a failure of a brake pressure control valve during a closed-loop control procedure a function of the system is maintained on the other wheel until an end of the closed-loop control procedure.

12. A braking device as defined in claim 1, wherein said system is formed so that in the case of a failure of a brake pressure control valve during a closed-loop control procedure a function of the system is maintained on the other wheel until the vehicle comes to rest.

13. A braking device as defined in claim 1, wherein said system is formed so that in the case of a failure of a hydraulic pump during a closed loop control operation the system is only switched off after an end of the closed-loop control operation.

14. A braking device as defined in claim 1, wherein said system is formed so that in the case of a failure of a hydraulic pump during a closed loop control operation the system is only switched off after the vehicle has to rest.

15. A braking device as defined in claim 1, wherein said system is formed so that in the case of an appearance of a low voltage during a closed loop control operation the system is only switched off after an end of the closed-loop control operation.

16. A braking device as defined in claim 1, wherein said system is formed so that in the case of an appearance of a low voltage during a closed loop control operation the system is only switched off after the vehicle has come to rest.

17. A braking device as defined in claim 1, wherein said system is formed so that in the case of a brake in a conductor of a brake light switch during a closed loop control operation the system is only switched off after an end of the closed-loop control operation.

18. A braking device as defined in claim 1, wherein said system is formed so that in the case of a brake in a conductor of a brake light switch during a closed loop control operation the system is only switched off after the vehicle has come to rest.

19. A braking device as defined in claim 1, wherein said system is formed so that in the case of switch fault of a hydraulic reservoir during a closed loop control operation the system is only switched off after an end of the closed-loop control operation.

20. A braking device as defined in claim 1, wherein said system is formed so that in the case of switch fault of a hydraulic reservoir during a closed loop control operation the system is only switched off after the vehicle has come rest.

21. A method of braking wheels of a two-wheel motor vehicle with two separately actuatable brakes and with a two-channel anti-lock brake system for both wheels, comprising the steps of switching the anti-lock brake system off when faults appear so that, when both wheels are being braked simultaneously and a fault occurs in one channel, a limited anti-lock brake system function is retained in form of a normal closed loop control using an intact channel and a pressure introduction at a brake of a defective channel until a certain vehicle deceleration is reached; and switching off the anti-lock brake system only when the vehicle comes to rest or when the anti-lock brake system closed-loop control operation ends.

* * * * *